June 5, 1962  D. Z. CHAPMAN  3,037,256
UNIVERSAL CAM LEVER FASTENER
Filed May 26, 1958
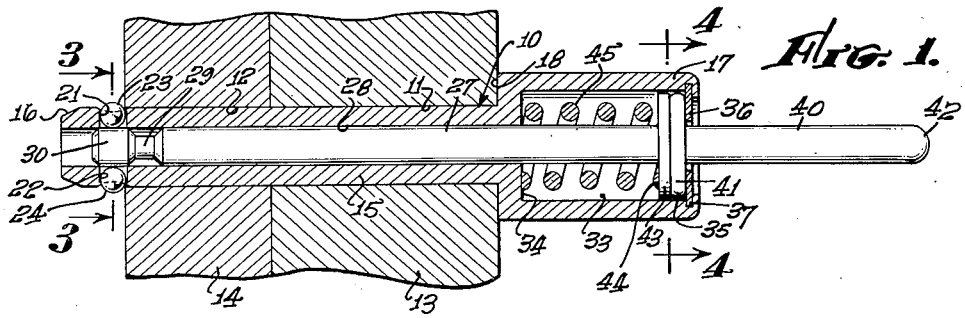
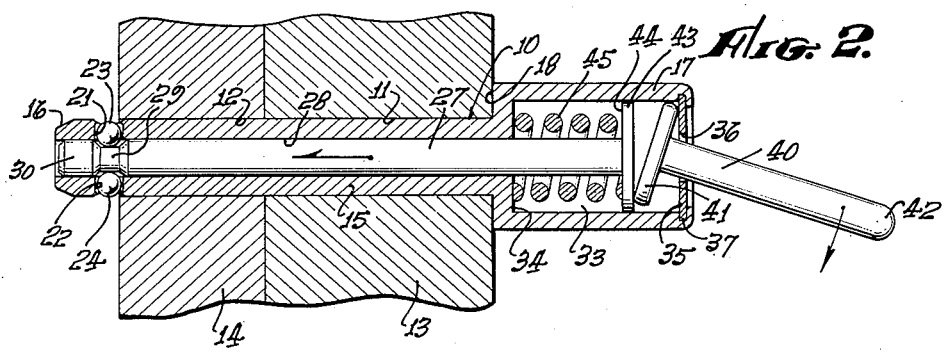
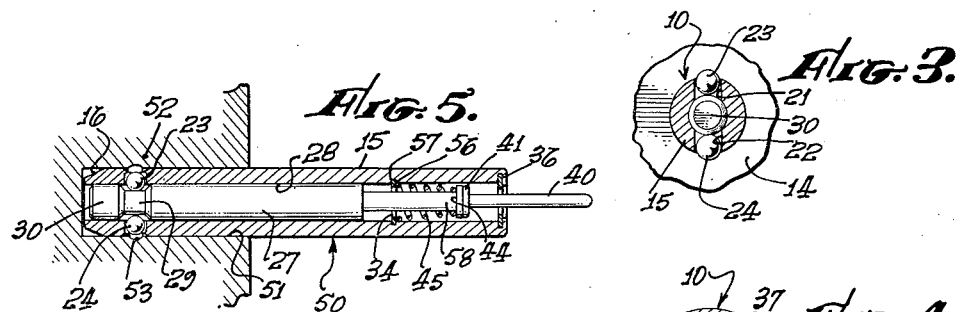
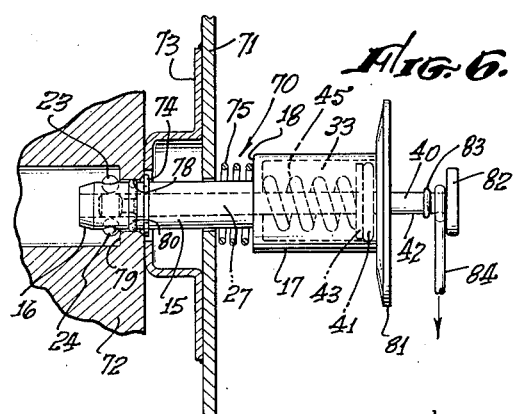
DAVID Z. CHAPMAN,
INVENTOR.
BY HIS ATTORNEYS.
HARRIS, KIECH, FOSTER & HARRIS.

# United States Patent Office 3,037,256
Patented June 5, 1962

3,037,256
UNIVERSAL CAM LEVER FASTENER
David Z. Chapman, Los Angeles, Calif., assignor, by mesne assignments, to Aerpat A.G., Glarus, Switzerland, a corporation of Switzerland
Filed May 26, 1958, Ser. No. 737,617
3 Claims. (Cl. 24—211)

This invention relates to a fastener of the rapid engagement, quick release type and, more particularly, to a fastener of this type having improved means for actuation thereof. The fastener of the invention may be used to join two or more members by inserting the fastener into registering holes in the members and may also be used to mount one member on another by affixing the fastener to one member and locking it into an opening in the other member.

It is an object of the invention to provide a fastener of this general type which can be locked and unlocked by the action of a lever whose direction of motion is not limited, i.e., by lever movement in any direction. A further object of the invention is to provide such a fastener which can be unlocked by depressing an actuating lever.

The invention contemplates the use of a fastener having a body with a longitudinal passage therein, a detent carried adjacent one end of the body and movable inwardly and outwardly between inner, retracted and outer, extended positions with the detent projecting laterally from the body when in said extended position for locking the fastener in place, a pin movable in the passage between locked and unlocked positions and having means thereon adjacent one end thereof for moving the detent outwardly into its extended position when the pin is in the locked position, spring means engaging the body and the pin and urging the pin toward the locked position, and a cam engaging the body and the pin, which cam is tiltable about a plurality of axes and preferably in any direction, to move the pin against the urging of the spring means to the unlocked position, permitting insertion and removal of the fastener.

It is another object of the invention to provide such a fastener in which the cam comprises a plate-like member positioned between the pin and a portion of the body so that tilting or pivoting of the cam in any direction will cause the pin to move relative to the body. A further object of the invention is to provide such a fastener in which the spring means urges the pin into engagement with the cam and clamps the cam in position between the pin and a portion of the body.

It is another object of the invention to provide such a fastener in which the travel of the pin between the locked and unlocked positions is limited by engagement of the pin, cam and body for the locked condition, and by engagement of the cam actuating lever and body for the unlocked condition.

It is an object of the invention to provide a universal cam fastener having an ejection spring for automatically ejecting the fastener when it has been released.

It is thus seen that the motions required to lock and release such a fastener are not limited to axial pushing and pulling, nor to pivoting movement along a single line or plane. Here the cam plate which provides the axial movement of the pin may be tilted or pivoted about any of a plurality of axes which are best described as intersecting and lying in a single plane. This is an important advantage of the present fastener and eliminates alignment and orientation problems in the placing of the fastener in position.

The invention will be described in detail herein in connection with a fastener which includes a barrel or body having one or more radial holes therethrough adjacent one end thereof, a detent in each of the radial holes in the body and movable inwardly and outwardly therein and between inner, retracted and outer, extended positions with each such detent projecting laterally from the body when in its extended position to prevent withdrawal of the body from the member in which the fastener is positioned, a plunger or pin movable axially in a longitudinal passage in the body between locked and unlocked positions with the pin having means thereon adjacent one end thereof for moving the detent or detents outwardly into its or their extended position or positions when the pin is in its locked position, a spring engaging the body and the pin and urging the pin toward its locked position, and a cam for moving the pin axially in the body.

The invention also comprises novel details of construction and novel combinations and arrangements of parts, together with other objects, advantages, features, and results, which will more fully appear in the course of the following description. The drawing merely shows and the description merely describes preferred embodiments of the present invention which are given by way of illustration or example.

In the drawing:

FIG. 1 shows a preferred form of the invention in the locked position;

FIG. 2 shows the structure of FIG. 1 in the unlocked position;

FIG. 3 is a sectional view taken along line 3—3 of FIG. 1;

FIG. 4 is a sectional view taken along line 4—4 of FIG. 1;

FIG. 5 is a view corresponding to FIG. 2 showing an alternative form of the invention; and FIG. 6 is a view corresponding to FIG. 1 showing another alternative form of the invention.

Referring to FIGS. 1 through 4 of the drawing, a fastener 10 is inserted through registering holes 11, 12 in plates 13, 14, respectively, for locking the plates together. The fastener 10 includes a tubular body 15 which is a sliding fit in the holes 11, 12, the body having a chamfered end 16 to facilitate insertion into the holes and an enlarged end 17 providing a shoulder 18 for bearing against the plate 13.

Aligned, radial passages 21, 22 are provided in the body 15 adjacent the end 16, with ball detents 23, 24 positioned in the passages 21, 22, respectively, for movement inwardly and outwardly between inner, retracted positions, shown in FIG. 2, and outer extended positions, shown in FIG. 1. The detents 23, 24 prevent withdrawal of the body 15 of the fastener from the holes 11, 12 when in their extended positions. The body 15 is peened or staked adjacent the outer ends of the passages 21, 22 to prevent loss of the detents from the passages.

A plunger or pin 27 is reciprocable in a longitudinal passage 28 in the body between a locked position, shown in FIG. 1, and an unlocked position, shown in FIG. 2. An annular groove 29 in the pin 27 is adapted to receive the ball detents 23, 24 therein to permit them to move inwardly into their retracted positions when the pin is in the unlocked position of FIG. 2, the groove 29 then being in register with the passages 21, 22. When the pin is in the locked position of FIG. 1, an end portion 30 thereof is in register with the passages 21, 22 to move the detents outwardly into their extended positions, thus preventing withdrawal of the fastener from the openings in the plates.

The end 17 of the body 15 of the fastener is enlarged to provide a chamber 33 having facing internal shoulders 34, 35, the outer shoulder 35 comprising a washer 36 positioned in a counterbore 37 in the end 17 with the extreme end spun over to hold the washer in position.

A cam 40 comprising a circular plate 41 and a lever arm 42 projecting therefrom is positioned with the plate within the chamber 33 and the arm projecting out from the chamber through the washer 36. A disc 43 is formed at the end of the pin 27 extending into the chamber 33, the disc providing an external shoulder 44 facing the inner internal shoulder 34. A compression coil spring 45 is positioned around the pin 27 between the facing shoulders 34, 44, with the spring urging the pin to the right or locked position as shown in FIG. 1 and clamping the plate 41 of the cam between the pin and the washer.

Normally, the spring 45 maintains the fastener in the condition of FIG. 1 which is the locked condition with the ball detents in their extended positions. Spring 45 also normally holds actuating lever 42 in axial alignment with the pin 27, see FIG. 1. The end of lever 42 located within the passage 33 is, in effect, mounted for pivotal movement of the handle portion of the lever in any direction. In order to insert the fastener into a hole or remove it from a hole, it is only necessary to tilt the cam 40 by tilting the lever 42 in any direction from the position of FIG. 1. On tilting, the spring will be compressed and the groove 29 will be brought into register with the detents, permitting the detents to move inwardly in the detent passages, thus permitting the body of the fastener to be inserted or extracted from the hole in the member being fastened or unfastened. Preferably, the opening in the washer 36 is sized to act as a stop for positioning the groove 29 opposite the detents 23, 24 when the cam 40 is tilted with the lever arm 42 engaging the washer. On release of the cam, the spring will return the pin to the locked condition, extending the detents as shown in FIG. 1. The fastener may also be unlocked by depressing the cam, i.e., by moving the cam to the left as viewed in FIG. 1, which also results in compression of the spring 45 and movement of the pin to the unlocked position. Of course, the fastener may also be operated by any combination of tilting and depressing motions.

FIG. 5 shows a fastener 50 which is similar to the fastener 10, with identical parts being indicated by the same reference numerals. The fastener 50 is positioned in a hole 51 of a member 52, the member having an annular groove 53 for receiving the detents of the fastener when in their extended positions for locking the fastener and any members carried thereby to the member 52. It should be noted that both the fastener 10 and the fastener 50 can be used for mounting in the member 52, and both the fasteners can be used for joining the plates 13, 14.

In the fastener 50, the passage 28 extends through the body 15 with a snap ring 56 positioned in an internal groove 57 to provide the shoulder 34. A section 58 of reduced diameter of the pin 27 provides space for the encircling coil spring 45.

The fastener 50 is operated in the same manner as the fastener 10, the former being shown in the unlocked condition in FIG. 5, which position has been achieved by depressing the cam as previously discussed. Of course, the fastener 50 may be unlocked by tilting the cam in the manner shown in FIG. 2.

FIG. 6 shows a fastener 70 which is similar to the fasteners 10 and 50, with identical parts being indicated by the same reference numerals. The fastener 70 is used to mount a first member 71 on a second member 72. The body 15 of the fastener is slidingly positioned in aligned openings in the member 71 and a spacer bracket 73 fixed to the member 71 by welding or the like. A snap ring 74 is positioned in an external annular groove on the body 15, the snap ring being of greater diameter than the opening in the member 71 to retain the fastener in the member. A compression coil spring 75 is positioned around the body 27 between the shoulder 18 and member 71. As shown in FIG. 6, the spring is compressed and serves to eject the fastener from the member 72 when the detents move to their inner positions.

The member 72 includes an aperture 78 for slidingly receiving the body 15 of the fastener when the detents 23, 24 are in their inner positions. The aperture 78 terminates at a shoulder 79 which is engaged by the detents when in their extended positions to lock the fastener in place, as shown in FIG. 6. An O-ring 80 is mounted on the body 15 between the detents and the snap ring 74 providing a seal against the sides of the aperture 78.

In this embodiment of the fastener, the end 17 of the body 15 has an outwardly flared rim 81 and the lever arm 42 has an enlarged head 82. The member 71 may be mounted on the member 72 by grasping the fastener with the thumb on the head 82 and two fingers around the end 17 under the rim 81. The spring 45 is pressed by squeezing action between the thumb and fingers, permitting the fastener to be moved into the member 72, after which the fastener is released. The head 82 and a spaced shoulder 83 on the lever arm 42 coact to retain a lanyard 84 for remote disconnecting of the members. When the lanyard is pulled in any direction, the cam action of the plate 41 with the disc 43 compresses the spring 45, permitting the detents to move to their inner positions. When the detents so move, the spring 75 ejects the fastener from the member 72 automatically.

Although exemplary embodiments of the invention have been disclosed and discussed, it will be understood that other applications of the invention are possible and that the embodiments disclosed may be subject to various changes, modifications, and substitutions without necessarily departing from the spirit of the invention.

I claim:

1. In a fastener, the combination of: a body having a longitudinal passage therein with two internal shoulders facing each other adjacent one end of the body; a detent carried adjacent the other end of said body and movable inwardly and outwardly between inner, retracted and outer, extended positions, said detent projecting laterally from said body when in said extended position; a pin movable in said passage between locked and unlocked positions and having means thereon adjacent one end thereof for moving said detent outwardly into its extended position when said pin is in said locked position, said pin having an external shoulder adjacent the other end thereof and located between the two internal shoulders of said body; a cam plate positioned between the shoulder of said pin and the outer one of said internal shoulders of said body, said cam plate including an arm extending out of said passage past said outer internal shoulder; and a compression coil spring positioned around said pin between said external shoulder of said pin and the inner internal shoulder of said body and urging said pin toward said locked position and clamping said plate between said pin and said outer internal shoulder, said plate being tiltable to move said pin to said unlocked position against the urging of said spring by tilting of said arm in any direction, said arm passing through a restricted opening in said body which prevents further tilting of said plate when said pin is in said unlocked position.

2. In a fastener, the combination of: a body having a longitudinal passage therein; a detent carried adjacent one end of said body and movable inwardly and outwardly between inner, retracted and outer, extended positions, said detent projecting laterally from said body when in said extended position; a pin movable in said passage between locked and unlocked positions and having means thereon adjacent one end thereof for moving said detent outwardly into its extended position when said pin is in said locked position; first spring means engaging said body and said pin and urging said pin toward said locked position; a cam engaging said body and said pin and tiltable about a plurality of axes in a plane, said cam moving said pin toward said unlocked position against the urging of said first spring means when tilted relative to said body and pin; a member having an opening with said body slidingly positioned therein; second spring means engaging said body and said member and urging said body away from said member in the direction of the other end of said body; and a stop carried on said body adjacent said one end for engaging said member and limiting movement of said body relative to said member in said direction.

3. In a fastener, the combination of: a body having a longitudinal passage therein; a detent carried adjacent one end of said body and movable inwardly and outwardly between inner retracted and outer extended positions, said detent projecting laterally from said body when in said extended position; a pin movable in said passage between locked and unlocked positions and having means thereon adjacent one end thereof for moving said detent outwardly into its extended position when said pin is in said locked position; unlocking plate means positioned in said passage of said body for engagement with the other end of said pin, said plate means being tiltable relative to said body and pin; first spring means engaging said body and said pin and urging said pin toward said locked position and into engagement with said plate means with the tilting movement of said plate means moving said pin to said unlocked position against the urging of said first spring means; a member having an opening with said body slidingly positioned therein; second spring means engaging said body and said member and urging said body away from said member in the direction of the other end of said body; and a stop carried on said body adjacent said one end for engaging said member and limiting movement of said body relative to said member in said direction.

References Cited in the file of this patent
UNITED STATES PATENTS

| 2,755,671 | Delany | July 24, 1956 |
| 2,786,383 | Bachman | Mar. 26, 1957 |

FOREIGN PATENTS

| 524,297 | Great Britain | Aug. 2, 1940 |